Nov. 3, 1953 H. N. MAIER 2,657,668
APPARATUS FOR IMPREGNATING AND COATING POROUS BODIES
Filed June 4, 1948
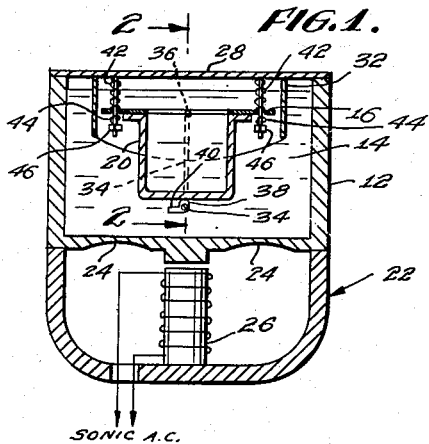
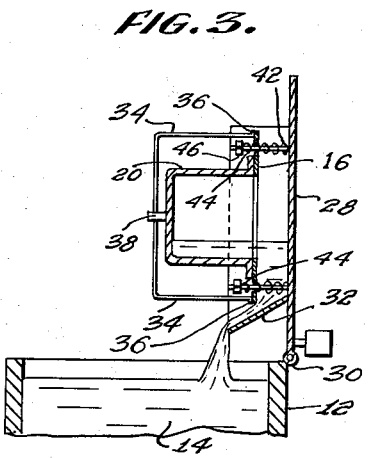
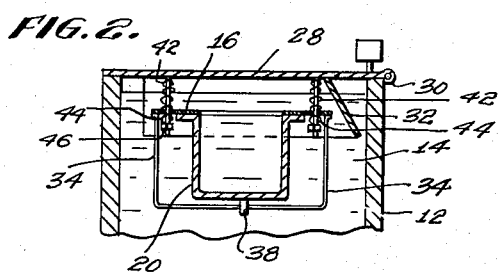
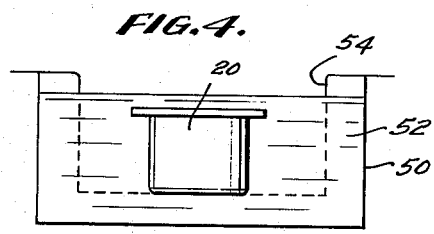
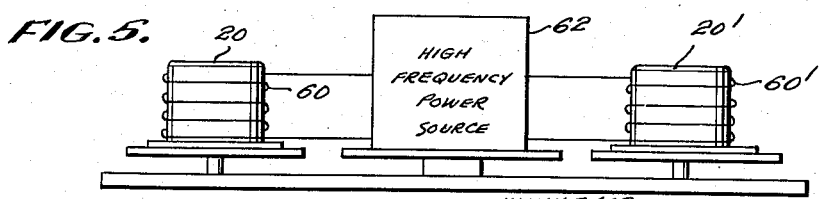
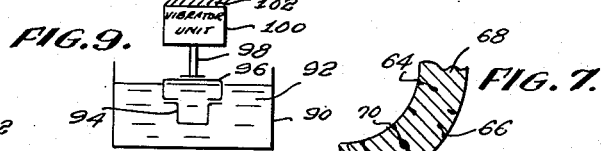
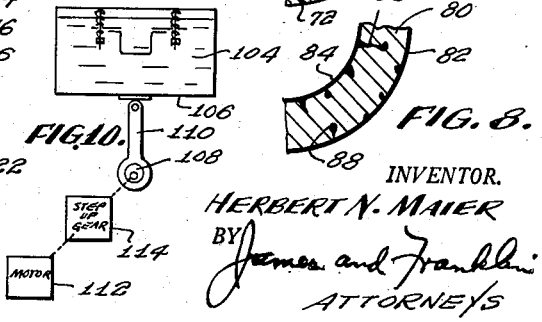
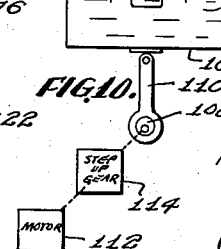
INVENTOR.
HERBERT N. MAIER
BY
ATTORNEYS Patented Nov. 3, 1953

2,657,668

UNITED STATES PATENT OFFICE 2,657,668

APPARATUS FOR IMPREGNATING AND COATING POROUS BODIES

Herbert N. Maier, Pottstown, Pa., assignor, by mesne assignments, to National Lead Company, New York, N. Y., a corporation of New Jersey Application June 4, 1948, Serial No. 31,127

11 Claims. (Cl. 118—612)

1

This invention relates to the impregnation of porous bodies, especially die cast metal bodies, usually to make the same leak-proof, but in some cases for other purposes, as, for example, to better adhere a surface coating on the body.

The prior method for impregnation is to put the article in a tank, from which the air is pumped out and a vacuum maintained until air is removed from the article. In the case of die castings this refers to pores, cold shuts, pipes, shrinkages, etc. In electrical devices it refers to space between coil windings, between layers of insulation, layers of mechanical construction, etc. After air has been removed, sufficient impregnating medium is introduced to cover the article. Then as much pressure as practicable is introduced. This high pressure is maintained for sufficient time to force the liquid into all the cavities which are to be impregnated. The pressure is then reduced to atmospheric pressure, the tank is opened, and the article is removed from the impregnating compound. The articles may be washed, and air dried, or put in an oven to polymerize or otherwise chemically change the impregnating medium, or they may be put in hot oil to finish the sealing process, all depending on the type of compound used.

There are other processes for impregnation, but all are rather costly and slow. Also there is a high percentage of "leakers" even after treatment.

The main object of the present invention is to overcome the foregoing difficulties and to provide a generally improved method and apparatus for impregnation of a porous body. Other objects are to provide a process and apparatus which have a fast cycle, and which perform a more thorough job. Further objects are to provide apparatus which is relatively compact and requires only small floor space, and which requires a relatively small bath of impregnating material.

Still another object is to provide an apparatus which is flexible and applicable to small batches of work or to single articles. Other objects are to facilitate immersion and removal of the article from the apparatus, to avoid marring the surface of the article, and to avoid splash and loss of impregnating compound from the apparatus.

Other objects of the invention center about the painting or coating of an article. Heretofore articles have been sandblasted, etched, ground, bonderized or chemically treated in order to provide a better bond for paint or other finishes which may be sprayed, dipped or applied with a

2 brush. Objects of the present invention are to eliminate the need for such extra operations on the surface of the body prior to coating, and to insure good adherence of the coating by better impregnating parts of the coating into the pores of the body.

The method of my invention is not claimed herein, it being claimed in my divisional application Serial No. 377,902, filed September 1, 1953, and entitled "Method for Impregnating and Coating Porous Bodies." The claims herein are directed to the apparatus.

To accomplish the foregoing general objects, and other more specific objects which will hereinafter appear, my invention resides in the method steps and apparatus elements and their relation one to another, as are hereinafter more particularly described in the following specification. The specification is accompanied by a drawing in which Fig. 1 is a section taken in elevation and schematically illustrating one form of apparatus for practicing the invention;

Fig. 2 is a transverse section taken approximately in the plane of line 2—2 of Fig. 1;

Fig. 3 is a section similar to Fig. 2 but with the cover opened;

Fig. 4 symbolizes a cleaning step which may be desirable in some cases;

Fig. 5 illustrates one convenient method of baking the impregnated articles;

Fig. 6 is a section generally similar to Fig. 1, but showing a modification for the impregnation of batches of small articles;

Fig. 7 is an enlarged section of a fragment of an article, showing impregnation to make the article leakproof;

Fig. 8 is a similar section, showing surface coating;

Fig. 9 schematically illustrates a modification in which the article is vibrated relative to the liquid; and Fig. 10 schematically illustrates a modification in which the vibration is obtained by high speed mechanical means.

Referring to the drawing, and more particularly to Figs. 1, 2 and 3, the apparatus comprises a tank 12 of a suitable filling material 14 in liquid form, said material being adapted to dry or to polymerize or to otherwise change to solid form. Mounting means 16 supports the body 20 being treated, immersed in the liquid 14. The apparatus further comprises means generally designated 22 to relatively vibrate the body 20 and the liquid 14. This vibration is preferably vigorous, and is preferably at a relatively high frequency. In the present case a part of the wall area of the tank is a vibratile diaphragm. More specifically, the bottom wall 24 of the tank acts as the diaphragm, and is vibrated by electromagnetic means 26 energized by alternating current from a suitable power source. The vibration is at a frequency in the range of sonic and supersonic frequencies, but is preferably higher than the lowest sonic frequencies. A frequency of 360 cycles per second is conveniently obtainable, and has been found satisfactory in operation. The precise mechanism and electrical circuits for producing the desired vibration of the diaphragm 24 need not be described in detail, for they may be of a general type which has already been developed for wholly different purposes, such as submarine signalling, and the homogenization of milk.

The tank 12 may be provided with an openable cover 28, which in this case is a hinged cover hinged at 30, and the mounting means 16 is preferably secured to the cover, so that closing and opening of the cover may be used to immerse or remove the body 20 from the liquid. In such case the cover is preferably provided with a drainage scoop or apron 32, the said wall or apron extending around three sides of the support 16, and serving to guide the flow of liquid from the body 20 back into the tank when the cover is raised, as is most clearly shown in Fig. 3. This is a great convenience because the hollow or tank-like body 20 which is being treated to make the same leak-proof is filled with liquid during the treatment, and this liquid, as well as the liquid on the outside, must be drained from the body as it is removed from the tank. The mounting means 16 preferably includes a quick releasable clamp for temporarily holding the body in position, and in the present case this comprises a generally U-shaped yoke 34, hinged at 36 so that it may be turned to one side or the other, and having a cam 38 which may be turned by means of a handle 40 to wedge the same against the object 20.

The mounting means 16 is preferably vibratably secured to the cover. For this purpose it is here illustrated as held at its four corners between powerful compression springs 42 above the mounting plate 16, and similar compression springs 44 below the plate 16, said springs being held under tension by means of nuts 46. The plate 16 is, of course, cut away at the top of the body 20 to permit free access of the vibrating liquid to the inside and outside walls of the body.

After the body has been immersed in the liquid and subjected to vibration, as illustrated in Figs. 1 and 2, it is removed and drained, as shown in Fig. 3, and then in certain cases, where a clean surface is required, it may be cleaned, washed or dipped in a suitable solvent, a step which is schematically illustrated in Fig. 4 of the drawing, showing a tank 50 of a solvent or cleaning fluid 52 in which the treated body 20 is immersed and removed as by means of a cage 54. The surface cleaning must not be such as to remove the material impregnated into the pores of the article.

A commonly preferred impregnating liquid is a polymerizable resin, and in most cases these are reacted or polymerized by the application of heat. For this purpose the treated article may next be conveyed through a baking oven on a conveyor belt or, what is even faster and more convenient, may be subjected to induction heating. This is illustrated in Fig. 5 of the drawing, in which treated articles 20 and 20' are shown surrounded by high frequency coils 60 and 60', the said coils being energized from a high frequency power source 62. Induction heating at low frequency is also a possibility. Another convenient method of heating is the use of radiant heating, which in some cases may be most economical. In certain cases, with objects of irregular shape, radiant heating may have the advantage of reaching a certain temperature which increases no further and thus guards against overheating.

Sealing is shown in Fig. 7 of the drawing, in which pores such as those illustrated at 64 and 66 extend only partway through the wall 68 of the article, while a few pores such as 70 and 72 pass entirely through the wall. The important feature of the sonic or supersonic vibration method of my invention is that it effectuates a penetration of the impregnant deeply into or entirely through such pores.

The impregnating work may require the use of a special resin because of the nature of the end use of the product. In general, the fluid used should be of low enough viscosity and its molecular structure should be small enough to penetrate the pores or openings which are objectionable in the finished product. The chemical structure of the impregnating liquid should not be adversely affected by the vibrations. Different impregnating fluids need different kinds of treatment in order to polymerize them.

Fig. 6 illustrates a minor modification of the apparatus in which smaller articles are to be treated. In this case batches of the articles are placed in a perforate cage or container 76, and the latter is mounted in the apparatus. The basketful of articles may be removed as a unit after treatment, and replaced by another similar basketful of articles.

It is not essential to vibrate the liquid. The important thing is relative vibration of the article and the liquid. For this purpose either or both may be vibrated, although in the latter case both should be vibrated in the proper relationship.

Fig. 9 schematically indicates a modification in which the article is itself vibrated in the liquid, and referring to that figure, the tank 90 carries liquid 92 in which the article 94 is immersed. The article is mounted on a suitable holder 96 carried by a plunger 98 leading to a suitable vibrator unit 100, which is itself stationarily mounted as indicated at 102, or which in the alternative has so great a mass as to vibrate only a small amount relative to the vibration of the body 94. It will be understood that this apparatus will function to the same end and purpose as that previously described.

It is not essential that the vibration be obtained by electro-magnetic means and even mechanical means may be employed, provided it is designed for sufficiently high speed operation. Thus in Fig. 10 the tank 104 has a diaphragm 106 as its bottom. This diaphragm is vibrated by means of a high speed eccentric 108 connected to the diaphragm by means of an eccentric rod 110. The eccentric is itself rotated by a motor 112 working through a suitable high ratio step-up gear box 114. In any such apparatus it is important to machine all parts to great precision to insure pressure lubrication of all parts, to make vibrating parts of light weight metal, and to carefully counterbalance the rotating parts, for, as above indicated, a vibration frequency of say 360 cycles per second is desirable. The apparatus shown in Fig. 10, although mechanical, is not to be compared or confused with ordinary cumbersome, slow speed reciprocating machinery. It should be understood that the side wall of the tank does not vibrate. It is the bottom or diaphragm 106 that is vibrated by the eccentric.

In general, the vibrating diaphragm causes the impregnating compound within the tank to vibrate and set off sympathetic vibrations and/or harmonics of the fundamental frequency in any article which may be introduced into the vibrating impregnating compound. The tank is generally equipped with a cover to prevent the compound from splashing out during operation, and the cover is counterbalanced and hinged so that the fixture made to hold the article is raised or lowered into the liquid at the same time that the lid is raised or lowered.

The fixture helps introduce and remove from the compound the article to be impregnated. It also holds the article in a certain position which by virtue of the system allows this article to vibrate efficiently in sympathy with the compound. It also restrains the article when it is large and cumbersome from lying on the bottom of the tank and becoming mechanically marred by the vibrating diaphragm.

This fixture should be so constructed as not to mar the article when it is set into sympathetic vibration with the compound. The fixture should preferably be constructed and arranged to allow the article sufficient freedom of movement to vibrate with as little damping as possible. The oscillator may be automatically started when the cover is closed. When the time interval has elapsed which is necessary to completely impregnate the article, the oscillator stops, and the operator of the machines raises the hinged lid, removes the article, and repeats the same cycle. Several of these machines may be operated by one man, depending upon the length of time necessary for complete impregnation. I have found that it takes only from thirty seconds to two minutes, according to the type of article.

Consistent with the impregnating process, I have noticed a considerable amount of cleaning by the compound during the cycle. In other words, the vibrating impregnating compound does quite a good job of cleaning dirt off the surfaces of the article.

The probable theoretical explanation of the operation is as follows: The extreme vibrations set up very high positive pressure gradients and also negative pressure gradients, relative to atmospheric pressure. This probably flushes out all the holes in the article with impregnating compound, thereby displacing the air through a repeated number of oscillations. It is found that the pressure changes set up in the compound by sonic or supersonic vibrations are very large.

A synthetic resin material may be employed for the impregnating compound in some cases which will polymerize of its own accord within a few days. This makes the process more economical because it eliminates the need for baking after the actual impregnating process has been completed. In such cases the fact that the impregnating system herein described requires very little liquid for operation (in comparison with the tank system which uses many gallons of liquid) is an advantage. It is feasible to use a self-polymerizing agent which would have to be discarded every eight, sixteen, or twenty-four hours.

It is necessary to be careful in the selection of the impregnating compound for this system because vibration of this sort sometimes start chain reactions or otherwise change the chemical nature of the compound, causing it to lose its required properties.

With a permanent compound, that is, one which is not self reacting and which must be baked to polymerize the same, I have found it desirable to remove and filter the compound every so often, in order to remove finely divided impurities which come from the article. Such impurities may keep the compound from entering the holes to be impregnated, for often the pores and other objectionable holes are so small that only a compound having a very small molecular size will readily enter and seal them.

The impregnant need not be a polymerizable resin. Tung oil, for example, may be used. Other natural fillers, as well as synthetic fillers, may be used, and it makes little difference whether they polymerize, coagulate, crystallize or gel, etc., provided, however, that the vibration treatment does not injure their composition. One of the things which determines the filler to be used is the substance to which the finished article is to be subjected.

Generally similar apparatus may be employed if it is desired to coat rather than to leak-proof an article. The main difference resides in the nature of the liquid, and the subsequent steps may be modified accordingly. For example, the cleaning step, such as that shown in Fig. 4, for removing surface material, would be omitted, and instead the nature of the coating is such as to maintain a preferably uniform coating on the treated article. Most coatings may be air dried, thus eliminating the induction heating apparatus shown in Fig. 5. However, baking ovens with conveyor belts may be employed to speed up the drying of the paint or other coating, or the articles may be passed beneath banks of infra-red lamps, or through other known apparatus for drying.

Referring to Fig. 8 of the drawing, it will be seen that wall 80 of the object is coated at 82 and 84, the said coating being particularly well bonded to the surface because of the effective penetration of parts of the coating into the pores of the wall 80, as is indicated at 86, 88, etc. It is to aid and to insure a greater degree of this penetration by the coating into the pores of the material that the vibration step is employed. For this purpose, of course, it is not essential to force the liquid entirely through any of the deep pores, but a greater degree of penetration is obtained than when merely spraying or dipping the article.

The article need not be held in so special a fixture as is shown in Fig. 6, for the oscillations or vibrations do not have to be so intense as when impregnating for leakproofness. The entire setup may be similar to a continuous paint dip such as are now on the market, in that the articles may be introduced into the tank by a conveyor which has hooks on it from which to hang the articles being painted.

The vibration action in this method of paint dipping not only drives the paint into all crevices, holes, cracks, pores, etc., but it also drives the air out of the cavities, thereby eliminating most of the bubbles which sometimes occur when dipping articles in paint. A certain amount of cleansing action is also present in this system, which allows the large particles of dirt or foreign matter such as chips, etc., to fall to the bottom of the tank after being loosened from the article. This system also keeps the paint or other coating well mixed. It also drives the paint against the surface with such force that there is little or no chance for foreign substances to remain between the paint and the surface, which is an advantage even when the surface is non-porous. It drives the paint into the sharpest corners and undercuts, and if the article is rotated while submerged, it does a good job within a cavity, or inside an article, much as it does on the outside.

For impregnation (or coating), either a sonic or supersonic frequency of vibration may be employed. In general, it is simpler and easier to produce a sonic frequency vibration, for it is not essential in that case to employ vacuum tube oscillators and amplifiers, etc., although they may be used. On the other hand, a supersonic vibration has the advantage of avoiding the loud and disturbing noise produced by sonic equipment. Even in the case of supersonic vibration, however, care must be taken not to employ a frequency which may adversely affect personnel working around the equipment.

It will be understood that the vibration of the diaphragm may be produced in any of the known or conventional ways. The vibration of the diaphragm may be produced by mechanical means. The diaphragm may be vibrated by direct magnetic effect. It may also be vibrated by the use of a coil movably mounted in a suitable magnetic field, for example, a D. C. field, the coil carrying an excitation current, for example, a pulsating or an A. C. current. This would be analogous to the operation of a so-called "dynamic" loud speaker. The diaphragm may also be vibrated by magnetostriction of a ferrous or nickel alloy or other magnetostrictive rod, or by the use of a piezo crystal, for example, a quartz or a rochelle salt crystal. The alternating current may be obtained in any conventional apparatus, such as a vacuum tube oscillator, or a frequency multiplier, or a motor-driven generator. A variable frequency source may be employed if it is desired to vary the frequency in accordance with the size of the objects being treated, or the porosity or the hardness or the mass, etc., of the metal or plastic being treated.

The vibration may be obtained by using pulsating D. C. power, instead of A. C. power. Thus for magnetic striction it is sufficient that the magnetic field build up and collapse at the desired frequency, the polarization of the field being unimportant. In general it will be understood that vibration may be produced in ways other than those specifically illustrated.

Spaced diaphragms may be used on opposite walls of a tank and operated in push-pull, that is, in phase opposition. However, spaced diaphragms may also be used in a single tank without operating them in push-pull. For example, multiple diaphragms may be disposed in a single wall, and all be operated in unison, or several spaced diaphragms may be operated with difference in phase, but without necessarily being in phase opposition.

Moreover, basically it is not even essential that there be a flexible diaphragm in an otherwise rigid wall. However, it is believed that in every case it may be said that there is some form of mechanical network which is set into vibration as an entirety.

The elementary explanation that the diaphragm vibrates the liquid and the objects in contact with each other may be too simplified. In an assembly of this sort, the volume and weight of the liquid and objects usually go to form the mechanical equivalent of an impedance matching network which loads the entire system, keeping it in resonance with the excitation frequency.

It is believed that the method and apparatus of my invention, as well as the advantages thereof, will be apparent from the foregoing detailed description.

The cycle time is a matter of minutes instead of hours. The system is fast, simple, and efficient. It will be apparent that while I have shown and described my invention in several preferred forms, changes may be made without departing from the spirit of the invention, as sought to be defined in the following claims.

In the claims, for simplicity, I employ the word pores, but in those claims which do not refer specifically to die castings, the word pores is intended to include other spaces. For example, in electrical apparatus there may be small crevices between coil windings or between layers of insulation.

I claim:

1. Apparatus for permanently filling the pores in a body of material, said apparatus comprising a tank to be filled with a suitable filling material which is in liquid form but adapted to change to solid form, mounting means to support said body in said tank so that it will be immersed in the liquid, a diaphragm forming a part of the wall area of the tank, and means for vibrating said diaphragm at a frequency of vibration in the range of sonic and supersonic frequency.

2. Apparatus as defined in claim 1, in which the means to relatively vibrate the liquid and the body comprises a diaphragm forming the bottom wall of the tank, and electro-magnetic means together with an alternating current power source for vibrating said diaphragm.

3. Apparatus as defined in claim 1, in which the said tank is provided with a cover, and in which the mounting means is secured to the cover, whereby closing and opening of the cover may be used to immerse or remove the body.

4. Apparatus as defined in claim 1, in which the said tank is provided with a hinged cover, and in which the mounting means is secured to the cover, and said cover having drainage means for guiding the flow of liquid from the body back into the tank when the cover is raised about its hinge, whereby closing and opening of the cover may be used to immerse or remove the body.

5. Apparatus as defined in claim 1, in which the said tank is provided with a hinged splash-proof cover, and in which the mounting means is secured to the cover, said mounting means including a quick-releasable clamp for temporarily holding the body, whereby closing and opening of the cover may be used to immerse or remove the body.

6. Apparatus as defined in claim 1, in which the said tank is provided with a cover, and in which the mounting means is secured to the cover by resilient means affording ready vibration of the mounting means and body relative to the cover, said mounting means including a quick releasable clamp for temporarily holding the body firmly thereon, whereby closing and opening of the cover may be used to immerse or remove the body.

7. Apparatus as defined in claim 1, in which the said tank is provided with a hinged splash-proof cover, and in which the mounting means is resiliently secured to the cover, said mounting means including means for temporarily holding the body firmly thereon, and said cover having drainage means for guiding the flow of liquid from the body back into the tank when the cover is raised, whereby closing and opening of the cover may be used to immerse or remove the body.

8. Apparatus for permanently filling the pores in a body of material, said apparatus comprising a tank to be filled with a suitable filling material in liquid form, said material being adapted to change to solid form, a diaphragm forming a part of the wall area of the tank, means for vibrating said diaphragm in order to vibrate the liquid, a cover on said tank, and mounting means secured to the cover for temporarily holding the body which is to be impregnated.

9. Apparatus for permanently filling the pores in a body of material, said apparatus comprising a tank to be filled with a suitable filling material in liquid form, said material being adapted to change to solid form, a diaphragm forming a part of the wall area of the tank, means for vibrating said diaphragm in order to vibrate the liquid, a cover on said tank, mounting means secured to the cover, for temporarily holding the body which is to be impregnated, and said cover having drainage means for guiding the flow of liquid from the body back into the tank when the cover is raised, whereby closing and opening of the cover may be used to immerse or remove the body.

10. Apparatus for permanently filling the pores in a body of material, said apparatus comprising a tank to be filled with a suitable filling material in liquid form, said material being adapted to change to solid form, a diaphragm forming a part of the wall area of the tank, means for vibrating said diaphragm in order to vibrate the liquid, a cover on said tank, and mounting means resiliently secured to the cover, said mounting means including a quick releasable clamp for temporarily holding the body firmly thereon.

11. Apparatus for permanently filling the pores in a body of material, said apparatus comprising a tank to be filled with a suitable filling material in liquid form, said material being adapted to change to solid form, a diaphragm forming a part of the wall area of the tank, means for vibrating said diaphragm in order to vibrate the liquid, a cover on said tank, mounting means resiliently secured to the cover, said mounting means including a quick releasable clamp for temporarily holding the body firmly thereon, and said cover having drainage means for guiding the flow of liquid from the body back into the tank when the cover is raised, whereby closing and opening of the cover may be used to immerse or remove the body.

HERBERT N. MAIER.

References Cited in the file of this patent

UNITED STATES PATENTS

| Number | Name | Date |
|---|---|---|
| 1,092,761 | Tyler | Apr. 7, 1914 |
| 1,318,740 | Fessenden | Oct. 14, 1919 |
| 1,555,860 | Ledwinka | Oct. 6, 1925 |
| 1,675,419 | Myers | July 3, 1928 |
| 1,733,082 | McCullough | Oct. 22, 1929 |
| 1,939,712 | Mahoux | Dec. 19, 1933 |
| 2,293,840 | Lignian | Aug. 5, 1942 |
| 2,326,372 | Lignian | Aug. 10, 1943 |
| 2,376,706 | Lum | May 22, 1945 |
| 2,386,079 | Weiskoff | Oct 2, 1945 |
| 2,397,400 | Barwich | Mar. 26, 1946 |
| 2,522,082 | Arnold | Sept. 12, 1950 |